United States Patent [19]

Takao et al.

[11] Patent Number: 4,914,802

[45] Date of Patent: Apr. 10, 1990

[54] METHOD OF ASSEMBLING AUTOMOTIVE BODY STRUCTURE HAVING PRE-ASSEMBLED INNER COVER MEMBER ON EACH BODY UNIT.

[75] Inventors: Koji Takao, Atsugi; Hiroshi Kuriyama; Norio Kazama, both of Yokohama, all of Japan

[73] Assignee: Nissan Motor Co., Ltd., Yokohama, Japan

[21] Appl. No.: 160,435

[22] Filed: Feb. 25, 1988

[30] Foreign Application Priority Data

Feb. 26, 1987 [JP] Japan .............................. 62-27788[U]
May 13, 1987 [JP] Japan .............................. 62-116445

[51] Int. Cl.[4] .............................. B23P 21/00

[52] U.S. Cl. .............................. 29/469; 296/196; 296/197

[58] Field of Search .............. 29/429, 430, 469, 526 R, 29/783, 786, 787, 793, 794; 269/28.2; 296/28, 137, 187, 197, 196, 39.1

[56] References Cited

U.S. PATENT DOCUMENTS

| | | | |
|---|---|---|---|
| 2,389,907 | 11/1945 | Helmuth | 296/28 |
| 2,988,397 | 9/1956 | Brueder | 296/28 |
| 3,022,105 | 2/1962 | Tjaarda | 29/469 X |
| 3,326,599 | 6/1967 | Pashenee | 296/137 |
| 3,541,668 | 11/1970 | Wessells | 29/469 |
| 3,827,137 | 8/1974 | Schubach | 29/469 |
| 4,613,184 | 9/1986 | Rispeter et al. | 296/187 |
| 4,730,870 | 3/1988 | DeRees | 296/197 |
| 4,759,489 | 7/1988 | Pigott | 29/469 |

FOREIGN PATENT DOCUMENTS

| | | |
|---|---|---|
| 76934 | 4/1983 | European Pat. Off. . |
| 142581 | 5/1985 | European Pat. Off. . |
| 180554 | 5/1986 | European Pat. Off. . |
| 193499 | 9/1986 | European Pat. Off. . |
| 3119666 | 1/1982 | Fed. Rep. of Germany . |
| 3725807 | 2/1988 | Fed. Rep. of Germany . |
| 8602727 | 12/1986 | PCT Int'l Appl. . |
| 2096066 | 10/1982 | United Kingdom . |

OTHER PUBLICATIONS

"Method of Assembling Vehicle Body," Sankaido Co., Ltd., vol. XIX, Apr. 20, 1980, pp. 178–179.

*Primary Examiner*—Timothy V. Eley
*Assistant Examiner*—Peter D. B. Vo
*Attorney, Agent, or Firm*—Foley & Lardner, Schwartz, Jeffery, Schwaab, Mack, Blumenthal & Evans

[57] ABSTRACT

A method of producing a modular type automotive body structure is disclosed. The method comprises (a) preparing various preassembled body units, each having an inner decorative cover member laid on a surface defined therein, (b) joining the units together in such a manner that a peripheral edge portion of the inner decorative cover member of each unit is neatly received in a restricted clearance which is defined between actually joined portions of the respective units, and (c) securing the respective units by means of bolts and nuts in such a manner that the peripheral edge portion is fixed in the restricted clearance.

16 Claims, 5 Drawing Sheets

METHOD OF ASSEMBLING AUTOMOTIVE BODY STRUCTURE HAVING PRE-ASSEMBLED INNER COVER MEMBER ON EACH BODY UNIT.

BACKGROUND OF THE INVENTION

1. Field of the Invention

The present invention relates in general to a method of assembling an automotive body structure, and more particularly to a method of assembling a modular type automotive body structure. More specifically, the present invention is concerned with a method of producing an automotive body structure by assembling preassembled body units or moludes together.

2. Description of the Prior Art

As is known, many of the modern motor vehicles are of a frameless construction type which generally comprises closed section parts (such as pillers, side sills, side members, cross members, a cowl box, roof rails and the like) which are joined together to serve as a framework of the body and panels (such as side body panels, a roof panel and the like) which are attached to the framework to constitute the entire of the vehicle body. In two box type, an engine compartment and a passenger compartment are defined in the body structure, while, in three box type, an engine compartment, a passenger compartment and a trunk room are defined in the same.

In fact, during the assembling process, the closed section parts and the panels are joined, bolted and welded successively to constitute a so-called "white body", then the white body is transferred to a painting booth where the white body is painted and then to a fitting section where the body is equipped with an engine, an instrument panel, seats, and the like, and finally, the body thus almost finished is equipped with interior decorative parts, such as a floor rug, a wall cover, a kicking plate cover and the like. This assembling process is described in the volume XIX titled "METHOD OF ASSEMBLING VEHICLE BODY" issued from SANKAIDO Co., Ltd., on Apr. 20, 1980.

However, because of this successive assembling process, the main assembling line of the production plant is greatly expanded particularly in length. As is known, enlargement of the production line brings about various disadvantages including increased production cost and product mishandling.

Furthermore, in the above-mentioned assembling process, the final fitting of the interior decorative parts to the body should be made by having a worker put in a restricted inner space of the unfinished body. The handling work carried out in such restricted space is very difficult or at least troublesome. In fact, fitting a floor rug, a decorative inner cover and the like neatly to given portions of the unfinished body has required a great deal of skill.

SUMMARY OF THE INVENTION

It is therefore an object of the present invention to provide a method of assembling an automotive body structure, which is free of the drawbacks encountered in the above-mentioned conventional assembling process.

According to the present invention, there is provided a method of producing an automotive body structure, which comprises by steps preparing an engine compartment unit, a floor assembly unit, and a pair of body side assembly units, each having been preassembled and having an inner decorative cover member laid on a surface defined therein; joining the units together in such a manner that a peripheral edge portion of the inner decorative cover member of each unit is neatly received in a restricted clearance which is defined between actually joined portions of the respective units; and securing the respective units in such a manner that the peripheral edge portion is fixed in the associated clearance.

DETAILED DESCRIPTION OF THE INVENTION

Figure 1:
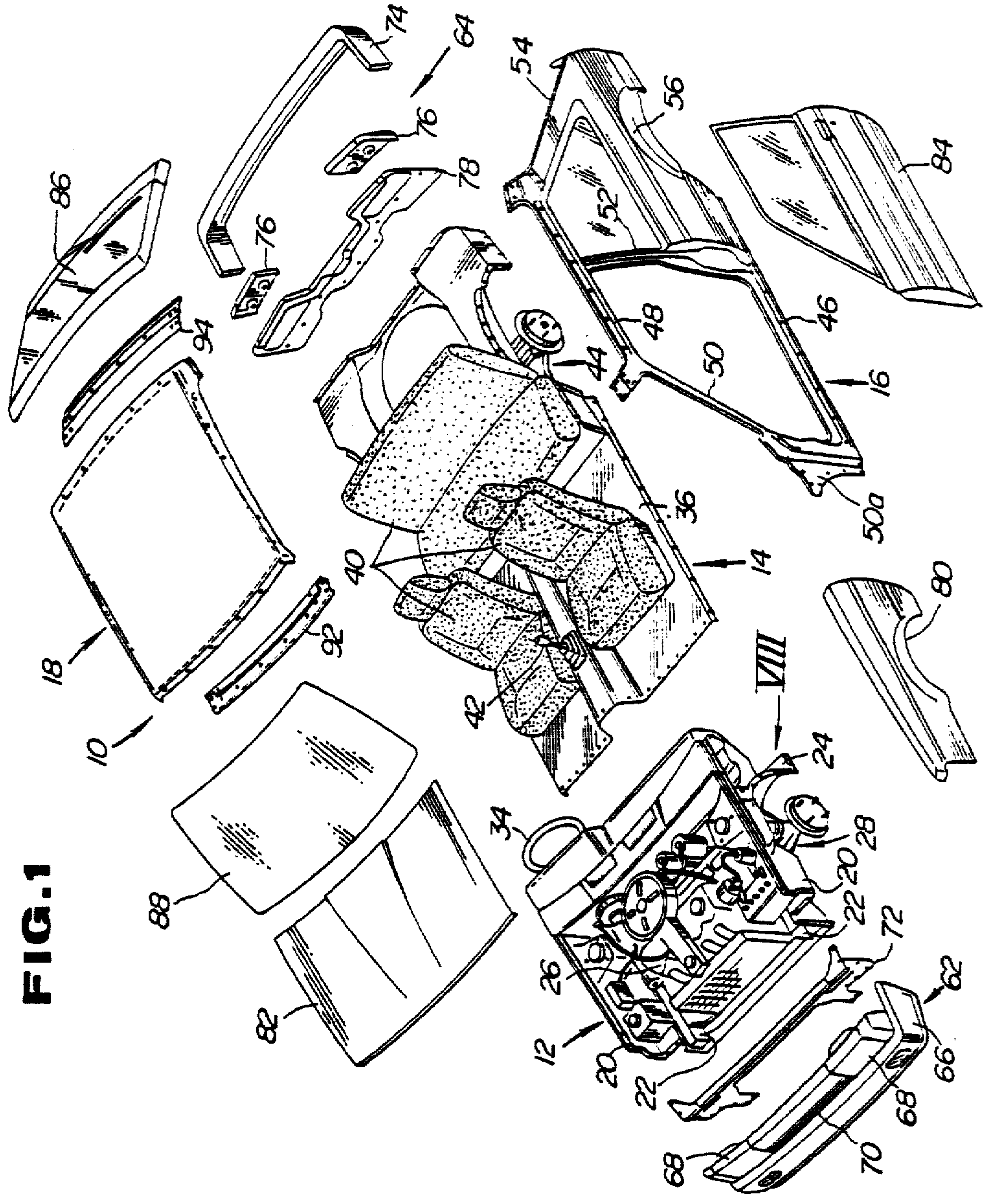
FIG. 1 is a plan view showing various preassembled body units or modules, which are to be assembled together in accordance with the method of the present invention.
Figure 2:
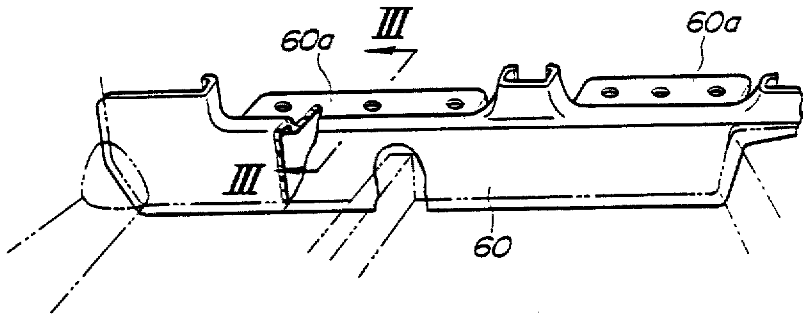
FIG. 2 is a perspective view of a still inner cover on a side sill in an assembled state.

Referring to FIGS. 1 to 8 of the drawings, particularly FIG. 1, there are shown preassembled body units or modules for an automotive body structure 10, which modules are to be assembled together in accordance with the method of the present invention.

The automotive body structure 10 is generally constructed of four preassembled major units or modules, which are an engine compartment unit 12, a floor assembly unit 14, right and left body side assembly units 16 (only one unit is shown) and a roof assembly unit 18.

The engine compartment unit 12 comprises paired hood ridge panels 20, paired front side members 22 and a dash panel 24, which have been assembled together and finally painted on a sub-production line. Substantially all elements, such as an engine unit 26, a radiator, an air cleaner, a power train device, auxiliary machinery of the power train device, electric devices, suspensions 28 and the like have been already mounted to the unit 12. As is seen from FIG. 8, the dash panel 24 has a dash-insulator 32 laid thereon. Furthermore, a steering wheel unit 34, various meters, foot pedals and the like have been assembled and mounted to the engine compartment unit 12 in a known manner.

Figure 8:
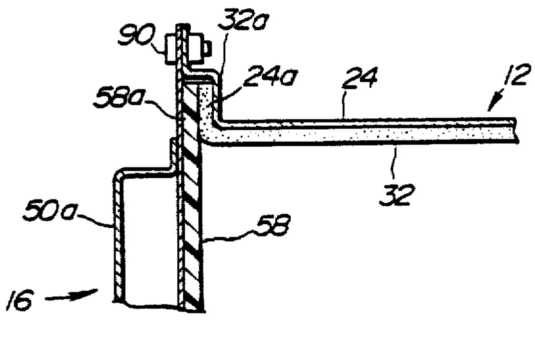
FIG. 8 is an enlarged sectional view of a dash panel and its associated parts, which panel is indicated by the arrow VIII of FIG. 1.

As is seen from FIG. 8, the dash-insulator 32 covers a surface of the dash panel 24. For the purpose which will become apparent hereinafter, the dash panel has at its each side a stepped portion 24*a*.

The floor assembly unit 14 comprises a floor panel 36 which has been assembled and finally painted. As is seen from FIGS. 3 and 4, a floor rug 38 has been laid on the floor panel 36. Furthermore, rear passenger's seat, front seats 400, a shift lever 42 and suspensions 44 have been mounted to the floor assembly unit 14 in a known manner.

Figure 3:
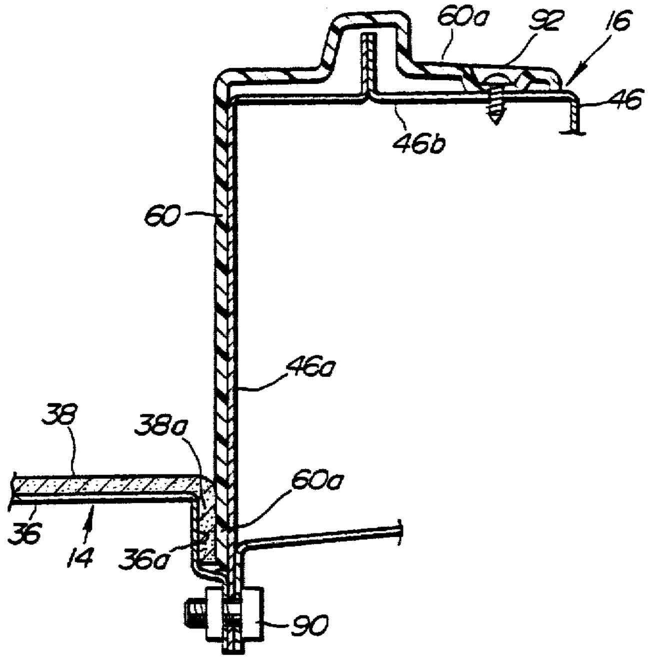
FIG. 3 is a sectional view taken along the line III—III of FIG. 2.
Figure 4:
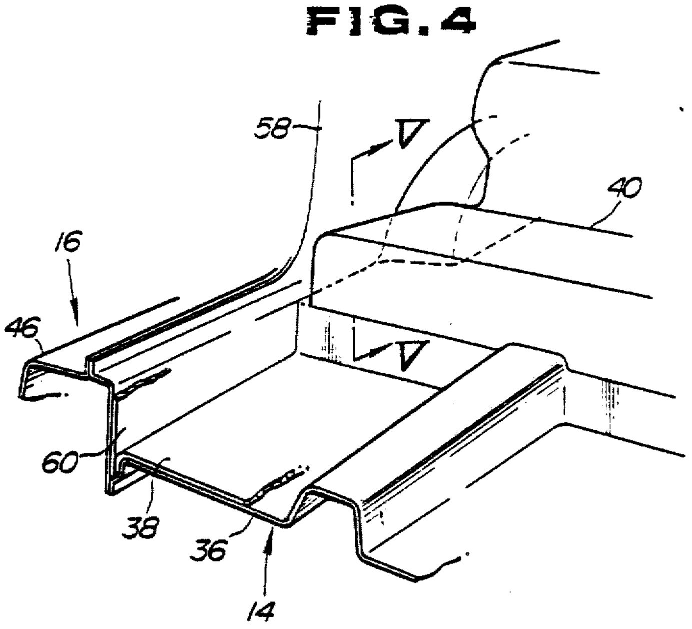
FIG. 4 is a perspective view of a rear corner part of the body structure, taken from the inside of the same.

As is seen from FIG. 3, the floor rug 38 covers the floor panel 36. The floor panel 36 has at its each side a stepped portion 36a for the purpose which will be clarified hereinafter. As is understood from FIGS. 4 and 5, the rear seat 40 is formed at each lateral lower side with an elongate projection 40a and the floor panel 36 is formed at each side with a stepped portion 36a for the purpose which will be clarified hereinafter.

As is seen from FIG. 1, each body side assembly unit 16 comprises a side sill 46, a roof side rail 48, a front pillar 50, a center pillar 52, a rear pillar 54 and a rear fender panel 56 which have been assembled together and finally painted. It is to be noted that the parts designated by 46, 48, 50, 52 and 54 are of a closed section part, which are assembled to form a framework to which the rear fender panel 56 is attached. A body side trim 58 (see FIGS. 5 and 8), a sill inner cover 60 (see FIGS. 2 and 3) and the like have been mounted to the body side assembly unit 16.

As is seen from FIG. 3, the sill inner cover 60 is constructed of plastic and arranged to cover both inboard and upper walls 46a and 46b of the side sill 46 and secured at its upper portion 60a to the upper wall 46b of the side sill 46 by connecting screws 92. If desired, as is seen from FIG. 9, the sill inner cover may be of a side wall rug 60' which has an upper end retained by a retainer or kicking plate 100 bolted to the side sill 46.

Figure 5:
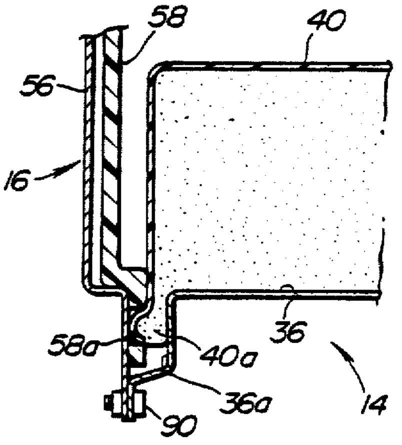
FIG. 5 is an enlarged sectional view taken along the line V—V of FIG. 4.
Figure 6:
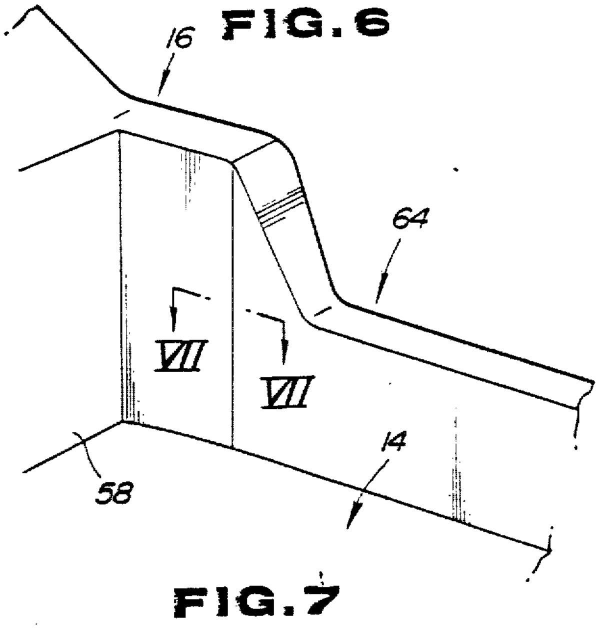
FIG. 6 is a perspective view of a rear portion of the body structure, taken from the inside of the same.
Figure 7:
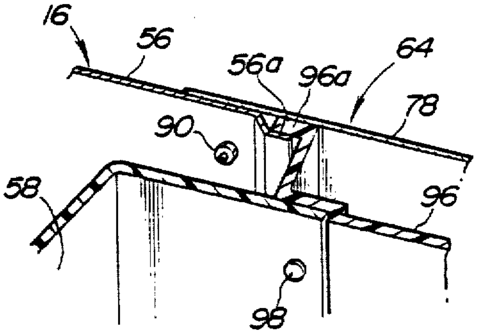
FIG. 7 is a sectional view taken along the line VII—VII of FIG. 6.

As is seen from FIG. 5, the body side trim 58 covers an inner surface of the rear fender panel 56 and has an elongate slot 58a formed therein.

The roof assembly unit 18 comprises roof bows and a roof panel which have been assembled together and finally painted. Although not shown in the drawings, a roof trim, a room lamp and the like have been also mounted to the assembly unit 18.

In addition to the above-mentioned four major units 12, 14, 16 and 18, the following two minor preassembled units or modules 62 and 64 have been prepared before the final assembly of the body structure 10.

One unit is a front end assembly unit 62 which comprises a front bumper 66, head lamps 68, a front grill 70 and a radiator support 72 which have been assembled together and finally painted. The radiator support 72 serves as a supporting base for the unit 62.

The other unit is a rear end assembly unit 64 which comprises a rear bumber 74, rear combination lamps 76 and a rear panel 78 which have been assembled together and finally painted. The rear panel 78 serves as a supporting base for the unit 64.

As will be understood hereinafter, two front fenders 80 (only one is shown), an engine hood 82, two side doors 84 (only one is shown), a hatchback door 86 and a front window pane 88 are assembled after completion of the assemblage of the above-mentioned six preassembled units 12, 14, 16, 18, 62 and 64.

Assembly of the six preassembled units is carried out in the following manner.

First, the engine compartment unit 12 and the floor assembly unit 14 are aligned and jointed together by using bolts and nuts (not shown).

Then, each of the body side assembly units 16 is conveyed to a side of the jointed two units 12 and 14 and connected to the same by means of bolts and nuts 90, as will be understood from FIGS. 3, 4, 5, 7 and 8.

During this process, any peripheral edge portion of the inner decorative cover member of each unit 16, 12 or 14 is neatly put between the actually joined portions of the respective units 16, 12 and 14, which will be clarified from the following description.

Figure 9:
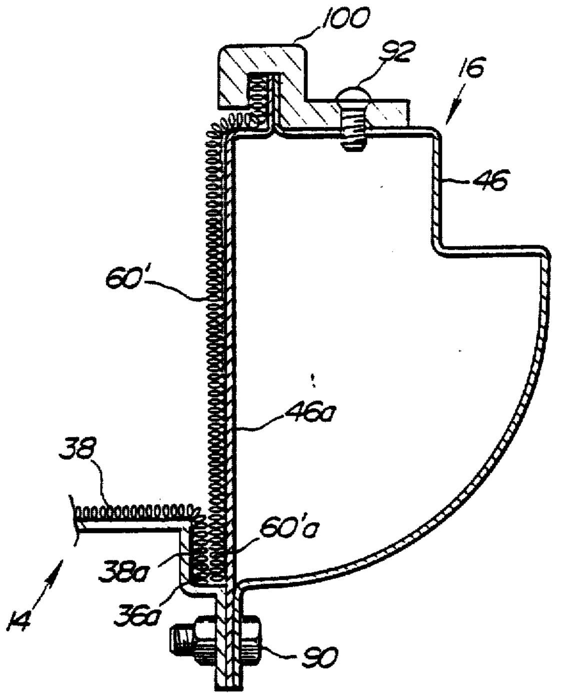
FIG. 9 is a view similar to FIG. 3, but showing a modification of one module (viz., body side assembly unit) used in the automotive body structure.

As is seen from FIG. 3, upon attachment of the body side assembly unit 16 to the joined two units 12 and 14, a lateral free end 38a of the floor rug 38 on the floor assembly unit 14 and a lower free end 60a of the sill inner cover 60 on the body side assembly unit 16 are neatly put into a restricted clearance which is defined between the stepped portion 36a of the floor panel 36 and the lower portion of the inboard wall 46a of the side sill 46. Thereafter, the floor panel 36 and the inboard wall 46a are secured to each other by means of the bolts and nuts 90. With this, the end 38a of the floor rug 38 and the lower free end 60b of the sill inner cover 60 are fixed in the clearance. (This procedure is similarly applied to the case wherein the modification of FIG. 9 is used. That is, lower free end 60'b of the side wall rug 60' is put into the restricted clearance 36a together with the free end 38a of the floor rug 38.)

As is seen from FIG. 5, the lateral lower end of the rear seat 40 on the floor assembly unit 14 and the lower end of the body side trim 58 on the body side assembly 16 are put into a restricted clearance which is defined between the stepped portion 36a of the floor panel 36 and the lower end of the rear fender panel 56. The elongate projection 40a of the rear seat 40 is put into the elongate slot 58a of the body side trim 58. The latching engagement between the projection 40a and the slot 58a becomes assured when the two units 14 and 16 are connected by means of the bolts and nuts 90. This operation is performed simultaneously with the operation described in the preceding paragraph.

Furthermore, as is seen from FIG. 8, a lateral free end 32a of the dash-insulator 32 on the engine compartment unit 12 and an upper free end 58a of the body side trim 58 on the body side assembly unit 16 are neatly put into a restricted clearance which is defined between the stepped portion 24a of the dash panel 24 and an intermediate portion 50a of the front pillar 50. These ends 32a and 58a are fixed in the clearance when the two units 12 and 16 are connected by means of the bolts and nuts 90. This operation is performed simultaneously with the operations described in the preceding two paragraphs.

Then, the roof assembly unit 18 is conveyed to a position above the joined units 12, 14 and 16 and connected to the same by means of bolts and nuts (not shown). For this connection, a front roof rail 92 (see FIG. 1) and a rear roof rail 94 are used.

Then, the front end assembly unit 62 is bolted to a front portion of the engine compartment unit 12, and the rear end assembly unit 64 is bolted to a rear portion of the floor assembly unit 14. As is seen from FIGS. 6 and 7, upon assembly of the rear end assembly unit 64 and the floor assembly unit 14, a peripheral free edge 96a of a rear panel trim 96 is put into a restricted clearance which is defined between a stepped portion 56a of the rear fender panel 56 on the body side assembly unit 14 and the rear panel 78 of the rear end assembly unit 64. (It is to be noted that the rear panel trim 96 is connected by clips 98 to the body side trim 58 of the body side assembly unit 16 prior to the mounting of the rear end assembly unit 64 to the floor assembly unit 14.)

Thereafter, the front fender 80, the engine hood 82, the side doors 84, the hatchback door 86 and the front window pane 88 are mounted to the body structure thus half assembled.

As will be understood from the foregoing description, in accordance with the method of the present invention, the main production line for the automotive body structure can be reduced in length because each body unit or module has been preassembled at the corresponding sub-production line. Furthermore, the fitting of the inner decorative cover members to the body structure can be easily carried out by a worker from the outside of the same.

What is claimed is:

1. A method of producing an automotive body structure comprising:

(a) preparing an engine compartment unit, a floor assembly unit, and a pair of body side assembly units, each unit having been preassembled and having an inner decorative cover member laid on an inner surface of each unit;

(b) joining said units together in such a manner that a peripheral edge portion of the inner decorative cover member of each unit is intimately received in a restricted clearance which is defined between actually joined portions of the respective units; and (c) securing the respective units in such a manner that each peripheral edge portion is fixed in each clearance.

2. A method as claimed in claim 1, further comprising the step of (d) securing a roof to said joined and secured units.

3. A method as claimed in claim 2, in which said roof assembly unit comprises roof bows and a roof panel which have been assembled together and finally painted.

4. A method as claimed in claim 1, in which the securing between said respective units is achieved by using bolts and nuts.

5. A method as claimed in claim 4, in which said inner decorative cover member of said floor assembly unit is a floor rug laid on a floor panel of said floor assembly unit.

6. A method as claimed in claim 4, in which each of said inner decorative cover members of said body side assembly units is a plastic cover which covers an inboard wall of a side sill of each of said body side assembly units.

7. A method as claimed in claim 4, in which said inner decorative cover member of said body side assembly unit is a rug which covers an inboard wall of a side sill of said body side assembly unit.

8. A method as claimed in claim 4, in which said inner surfaces of said engine compartment unit and said floor assembly unit are is formed with a stepped portion which constitutes a part of said restricted clearance when the respective units are joined together.

9. A method as claimed in claim 2, in which said engine compartment unit comprises paired hood ridge panels, paired front side members and a dash panel which have been assembled together and finally painted before the joining of the units.

10. A method as claimed in claim 9, in which said dash panel is formed with a stepped portion which forms a part of said restricted clearance.

11. A method as claimed in claim 9, in which said engine compartment unit has an engine unit, a radiator, an air cleaner, a power train device, auxiliary machinery of the power train device, electric devices and suspensions mounted thereon.

12. A method as claimed in claim 4, in which said floor assembly unit comprises a floor panel which has been assembled and finally painted, said floor panel being covered with a floor rug.

13. A method as claimed in claim 12, in which said floor assembly unit has a rear passenger's seat, front seats, a shift lever and suspensions mounted thereon.

14. A method as claimed in claim 4, in which each of said body side assembly units comprises a side sill, a roof side rail, a front pillar and a rear fender panel which have been assembled together and finally painted.

15. A method as claimed in claim 14, in which each body side assembly unit has a body side trim mounted thereon and said inner decorative cover member of each body side assembly unit is a sill inner cover covering both an inboard wall and an upper wall of said side sill and is connected to said upper wall by connecting screws.

16. A method as claimed in claim 15, in which said sill inner cover is constructed of plastics.

* * * * *